US008570906B1

(12) United States Patent
Croak et al.

(10) Patent No.: US 8,570,906 B1
(45) Date of Patent: Oct. 29, 2013

(54) METHOD AND APPARATUS FOR ASSIGNING A VIRTUAL NUMBER DURING PORTING OF A PRIMARY NUMBER

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1202 days.

(21) Appl. No.: 11/190,468

(22) Filed: Jul. 26, 2005

(51) Int. Cl.
*H04Q 11/04* (2006.01)
*H04L 12/66* (2006.01)
*H04M 7/00* (2006.01)
*H04M 15/00* (2006.01)

(52) U.S. Cl.
USPC ........... 370/259; 370/352; 370/353; 370/354; 370/356; 379/114.27; 379/221.13; 379/221.08

(58) Field of Classification Search
USPC .............. 370/395.3, 351, 463, 352–356, 259; 379/399.01, 243, 244, 201.01, 201.02, 379/201, 12, 114.28, 121.01, 114.27, 379/221.13, 221.08
See application file for complete search history.

(56) References Cited

U.S. PATENT DOCUMENTS

| | | | | |
|---|---|---|---|---|
| 4,191,860 A | * | 3/1980 | Weber | 379/115.01 |
| 5,732,131 A | * | 3/1998 | Nimmagadda et al. | 379/221.13 |
| 5,912,962 A | * | 6/1999 | Bosco | 379/219 |
| 5,915,008 A | * | 6/1999 | Dulman | 379/221.08 |
| 5,940,490 A | * | 8/1999 | Foster et al. | 379/211.02 |
| 6,134,316 A | * | 10/2000 | Kallioniemi et al. | 379/220.01 |
| 6,298,352 B1 | * | 10/2001 | Kannan et al. | 1/1 |
| 6,473,503 B1 | * | 10/2002 | Karau et al. | 379/221.13 |
| 6,614,780 B2 | * | 9/2003 | Hakim et al. | 370/352 |
| 6,657,994 B1 | * | 12/2003 | Rajakarunanayake | 370/352 |
| 6,798,772 B2 | * | 9/2004 | Bergman et al. | 370/354 |
| 6,898,413 B2 | * | 5/2005 | Yip et al. | 455/3.03 |
| 7,181,197 B2 | * | 2/2007 | Clayton | 455/411 |
| 7,209,553 B2 | * | 4/2007 | Doyle | 379/221.02 |
| 7,280,535 B1 | * | 10/2007 | Bergman et al. | 370/354 |
| 7,356,001 B1 | * | 4/2008 | Jones et al. | 370/331 |
| 7,620,163 B2 | * | 11/2009 | Moisan et al. | 379/112.01 |
| 7,664,245 B2 | * | 2/2010 | Coughlin et al. | 379/201.12 |
| 7,881,289 B1 | * | 2/2011 | Croak et al. | 370/356 |
| 2002/0080947 A1 | * | 6/2002 | Mikhailov et al. | 379/221.13 |
| 2003/0027521 A1 | * | 2/2003 | Yip et al. | 455/3.05 |
| 2004/0101123 A1 | * | 5/2004 | Garcia | 379/220.01 |
| 2004/0190708 A1 | * | 9/2004 | Cuckson et al. | 379/221.13 |
| 2004/0208181 A1 | * | 10/2004 | Clayton et al. | 370/395.4 |
| 2005/0074110 A1 | * | 4/2005 | Moreman | 379/212.01 |
| 2005/0117734 A1 | * | 6/2005 | Higgins | 379/221.13 |
| 2005/0169449 A1 | * | 8/2005 | Coughlin et al. | 379/201.12 |
| 2005/0190721 A1 | * | 9/2005 | Pershan | 370/328 |
| 2005/0190750 A1 | * | 9/2005 | Kafka et al. | 370/352 |
| 2005/0215250 A1 | * | 9/2005 | Chava et al. | 455/433 |

(Continued)

*Primary Examiner* — Asad Nawaz
*Assistant Examiner* — Wutchung Chu

(57) ABSTRACT

A method and apparatus for enabling a network provider to instantly assign a virtual number to a subscriber to use until their primary number is successfully ported to the VoIP network is disclosed. For example, a virtual number can be a phone number for callers outside a subscriber's local calling area to call the subscriber for the price of a local call if the subscriber chooses a virtual phone number in their local calling area. After the porting of the primary number is successful, the user can be reached by either having callers directly dial the primary number or the previously assigned virtual number. The subscriber can continue to use both phone numbers or choose to disconnect the virtual number and only use the successfully ported primary number.

8 Claims, 4 Drawing Sheets

(56) References Cited

U.S. PATENT DOCUMENTS

| | | | |
|---|---|---|---|
| 2006/0222156 A1* | 10/2006 | Smith et al. | 379/207.14 |
| 2007/0015535 A1* | 1/2007 | LaBauve et al. | 455/552.1 |
| 2007/0036172 A1* | 2/2007 | Lu | 370/463 |
| 2007/0036337 A1* | 2/2007 | Lu | 379/399.01 |
| 2007/0133778 A1* | 6/2007 | Kieren | 379/242 |

* cited by examiner

US 8,570,906 B1

METHOD AND APPARATUS FOR ASSIGNING A VIRTUAL NUMBER DURING PORTING OF A PRIMARY NUMBER

The present invention relates generally to communication networks and, more particularly, to a method and apparatus for assigning virtual numbers during porting of primary numbers in a communications network, e.g. a packet network such as a Voice over Internet Protocol (VoIP) network.

BACKGROUND OF THE INVENTION

Subscribers to residential VoIP network service sometimes desire to have their primary number ported to their VoIP services. A primary phone number is a phone number that a customer has originally with another network provider or a phone number associated with Public Switched Telephone Network (PSTN) services of the same network provider. The porting experience can sometimes lead to long delays in the activation of the new service due to mishaps in the processing of orders between the network provider of the primary number and the VoIP service provider. Customer frustration can also result if their primary service is disconnected before their number is ported to the new VoIP network causing them to have no phone service for a period of time.

Therefore, a need exists for a method and apparatus for assigning virtual numbers during porting of primary numbers in a packet network, e.g., a VoIP network.

SUMMARY OF THE INVENTION

In one embodiment, the present invention enables a network provider to instantly assign a virtual number to a subscriber to use until their primary number is successfully ported to a packet network, e.g., a VoIP network. For example, a virtual number is a phone number for callers outside a subscriber's local calling area to call the subscriber for the price of a local call if the subscriber chooses a virtual phone number in their local calling area. A virtual phone number is typically for incoming call purposes from the subscriber's perspective. After the porting of the primary number is successful, the user can be reached by either having callers directly dial the primary number or the previously assigned virtual number. The subscriber can continue to use both phone numbers or choose to disconnect the virtual number and only use the successfully ported primary number.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
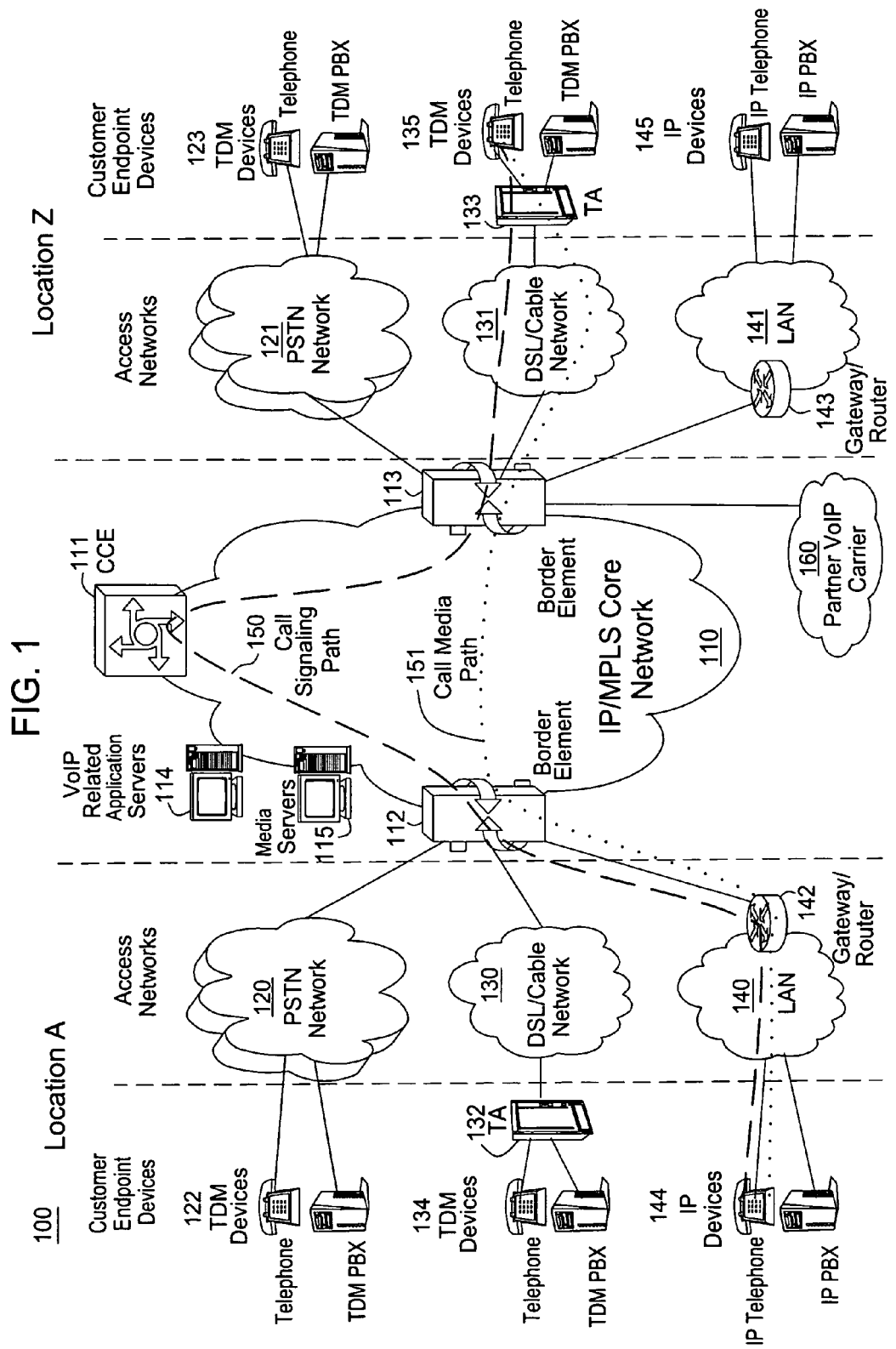
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers to residential packet network services, e.g., VoIP network services, sometimes desire to have their primary number ported to their VoIP services. A primary phone number is a phone number that a customer has originally with another network provider or a phone number associated with Public Switched Telephone Network (PSTN) services of the same network provider. The porting experience can sometimes lead to long delays in the activation of the new service due to mishaps in the processing of orders between the network provider of the primary number and the VoIP service provider. Customer frustration can also result if their primary service is disconnected before their number is ported to the new VoIP network causing them to have no phone service for a period of time.

To address this criticality, the present invention enables the network provider to instantly assign a virtual number to a subscriber to use until their primary number is successfully ported to the VoIP network. In one embodiment, a virtual number is a phone number for callers outside a subscriber's local calling area to call the subscriber for the price of a local call if the subscriber chooses a virtual phone number in their local calling area. A virtual phone number is typically for incoming call purposes from the subscriber's perspective. After the porting of the primary number is successful, the user can be reached by either having callers directly dial the primary number or the previously assigned virtual number. The subscriber can continue to use both phone numbers or choose to disconnect the virtual number and only use the successfully ported primary number.

Figure 2:
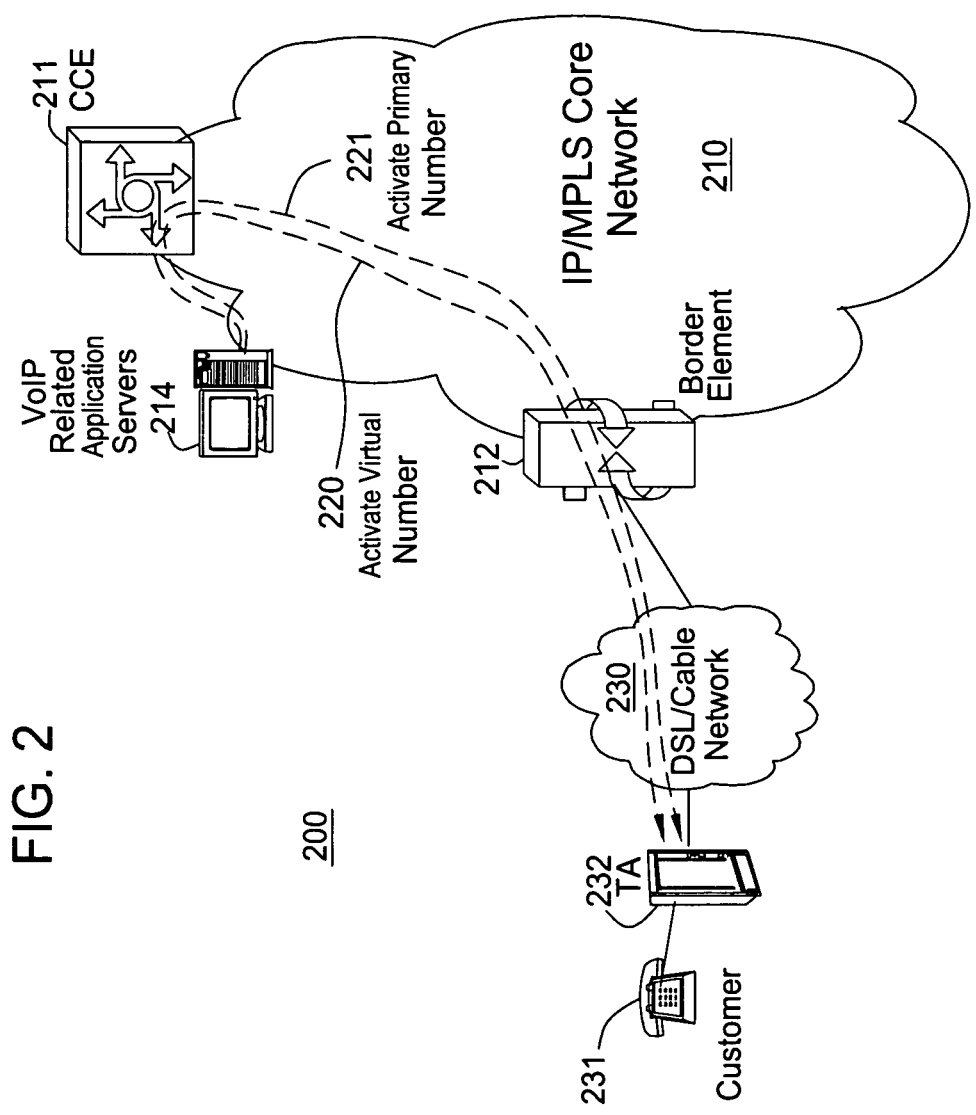
FIG. 2 illustrates an example of assigning virtual numbers during porting of primary numbers related to the present invention.

FIG. 2 illustrates an example of assigning a virtual number during porting of a primary number related to the present invention. In FIG. 2, customer 231 signs up for VoIP services and requests to port the primary number to the VoIP network. Since the porting of the primary number takes some time to complete, the network assigns a virtual number to customer 231 first so that customer 231 and make and receive calls using the assigned virtual number. The assignment of the virtual number is shown in flow 220 in which the mapping of the virtual number to the IP address of the endpoint device, TA 232, of customer 231 takes place via application server 214, CCE 211, BE 212 and access network 230. Customer 231 uses the virtual number to receive all incoming calls until the primary number is successfully ported to the VoIP network. The assignment of the primary number is shown in flow 221 in which the mapping of the primary number to the same IP address of the endpoint device, TA 232, of customer 231 also takes place via application server 214, CCE 211, BE 212 and access network 230. Once the primary number is successfully ported, customer 231 can be reached by either the virtual number or the primary number. Customer 231 has the option to disconnect the virtual number after the primary number has been successfully ported.

Figure 3:
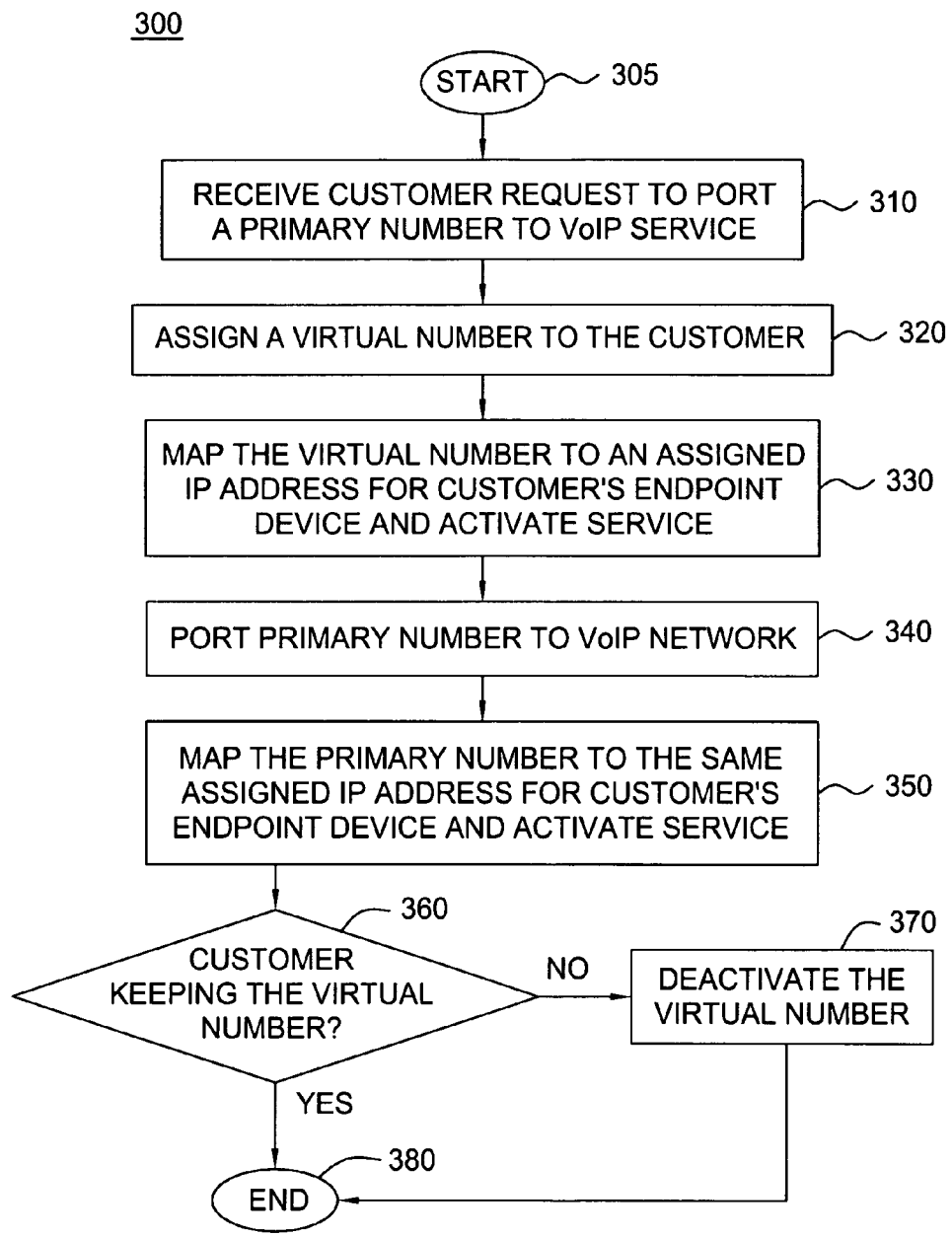
FIG. 3 illustrates a flowchart of a method for assigning virtual numbers during porting of primary numbers in a packet network, e.g., a VoIP network, of the present invention.

FIG. 3 illustrates a flowchart of a method 300 for assigning virtual numbers during porting of primary numbers in a packet network, e.g., a VoIP network. Method 300 starts in step 305 and proceeds to step 310.

In step 310, the method receives a request from a customer to port a primary phone number to the VoIP network. In step 320, the method assigns a virtual number to the customer to use while the requested primary number is being ported to the VoIP network. In step 330, the method maps the virtual number to the IP address of the VoIP endpoint device used by the customer. Once the virtual number is activated, the customer can make outgoing calls and receive incoming calls using the assigned virtual number. In step 340, the method completes porting the primary number of the customer to the VoIP network. In step 350, the method maps the primary number to the same IP address of the VoIP endpoint device used by the customer. Once the primary number is activated, the customer can make and receive calls using the primary number. Note that at this point, the customer can receive calls using either the virtual number or the primary number. In other words, a caller can reach the customer by dialing either the virtual number or the primary number. In step 360, the method checks if the customer wants to continue using the virtual number with the primary number simultaneously. If the customer wants to continue using the virtual number, the method proceeds to step 380; otherwise, the method proceeds to step 370. In step 370, the method deactivates the virtual number previously assigned to the customer. The method ends in step 380.

Figure 4:
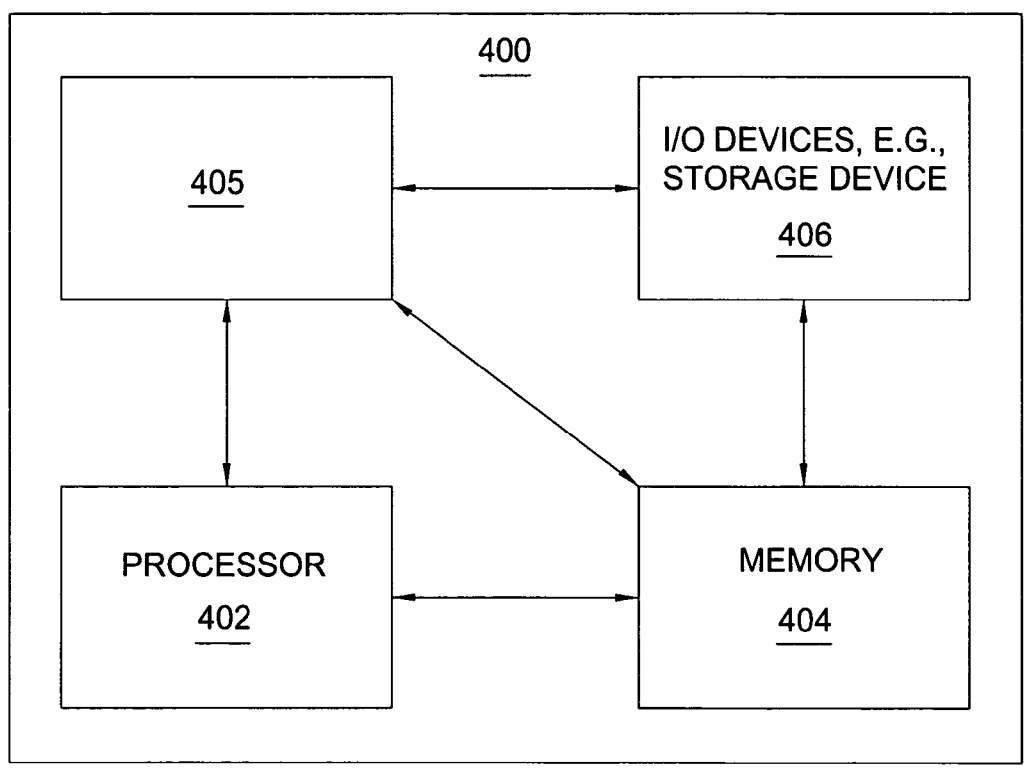
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a virtual number assigning module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present virtual number assigning module or process 405 can be loaded into memory 404 and executed by processor 402 to implement the functions as discussed above. As such, the present virtual number assigning process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for assigning a virtual phone number during porting of a primary phone number in a communication network, comprising:
receiving, by an application server in the communication network, a request from a customer to port the primary phone number to the communication network;
assigning, by the application server, the virtual phone number to the customer in response to receiving the request to port the primary phone number;
mapping, by the application server, the virtual phone number to an internet protocol address associated with an endpoint device of the customer; and
porting, by the application server, the primary phone number to the communication network for the customer, wherein the primary phone number is unavailable for receiving a call during the porting, and wherein the virtual phone number is useable for receiving a call during the porting,
mapping, by the application server, the primary phone number to the internet protocol address associated with the endpoint device of the customer after the primary phone number has been successfully ported, wherein the primary phone number and the virtual phone number are both used to receive incoming calls for the customer;
offering, by the application server, an option to the customer to continue to use both the primary phone number and the virtual phone number simultaneously; and
disconnecting, by the application server, the virtual phone number if the customer decides to only retain the primary phone number.

2. The method of claim 1, wherein the communication network is an internet protocol network.

3. The method of claim 1, wherein the primary phone number is used by the customer to complete a call.

4. A non-transitory computer-readable medium storing a plurality of instructions which, when executed by a processor, cause the processor to perform operations for assigning a virtual phone number during porting of a primary phone number in a communication network, the operations comprising:
receiving a request from a customer to port the primary phone number to the communication network;
assigning the virtual phone number to the customer in response to receiving the request to port the primary phone number;
mapping the virtual phone number to an internet protocol address associated with an endpoint device of the customer; and
porting the primary phone number to the communication network for the customer, wherein the primary phone number is unavailable for receiving a call during the porting, and wherein the virtual phone number is useable for receiving a call during the porting;
mapping the primary phone number to the internet protocol address associated with the endpoint device of the customer after the primary phone number has been successfully ported, wherein the primary phone number and the virtual phone number are both used to receive incoming calls for the customer;
offering an option to the customer to continue to use both the primary phone number and the virtual phone number simultaneously; and
disconnecting the virtual phone number if the customer decides to only retain the primary phone number.

5. The non-transitory computer-readable medium of claim 4, wherein the communication network is an internet protocol network.

6. The non-transitory computer-readable medium of claim 4, wherein the primary phone number is used by the customer to complete a call.

7. An apparatus for assigning a virtual phone number during porting of a primary phone number in a communication network, comprising:
an application server comprising a processor and a computer-readable medium storing a plurality of instructions which, when executed by the processor, cause the processor to perform operations, the operations comprising:
receiving a request from a customer to port the primary phone number to the communication network;
assigning the virtual phone number to the customer in response to receiving the request to port the primary phone number;
mapping the virtual phone number to an internet protocol address associated with an endpoint device of the customer; and
porting the primary phone number to the communication network for the customer, wherein the primary phone number is unavailable for receiving a call during the porting, and wherein the virtual phone number is useable for receiving a call during the porting
mapping the primary phone number to the Internet protocol address associated with the endpoint device of the customer after the primary phone number has been successfully ported, wherein the primary phone number and the virtual phone number are both used to receive incoming calls for the customer;
offering an option to the customer to continue to use both the primary phone number and the virtual phone number simultaneously; and
disconnecting the virtual phone number if the customer decides to only retain the primary phone number.

8. The apparatus of claim 7, wherein the communication network is an internet protocol network.

\* \* \* \* \*